Aug. 26, 1969  R. W. BLAKELY, JR  3,463,009
METHOD AND APPARATUS FOR MEASURING ABSOLUTE GAS PRESSURE
Filed Feb. 13, 1967  2 Sheets-Sheet 1
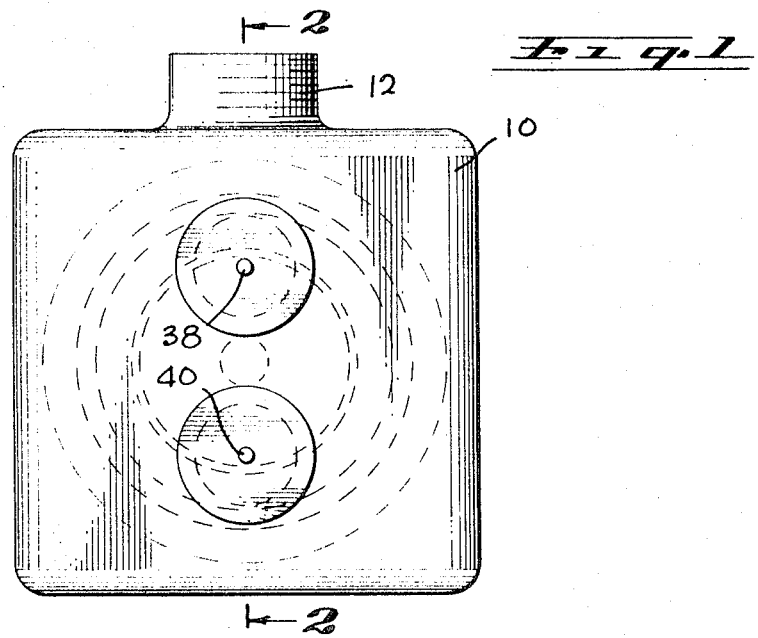
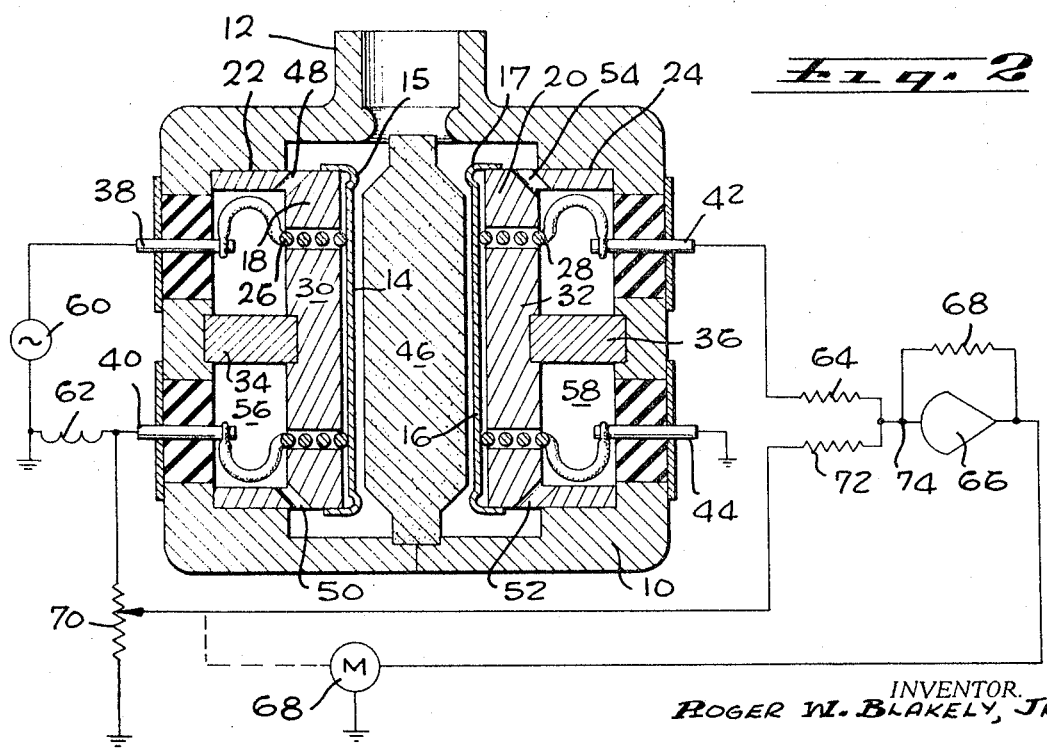
INVENTOR.
ROGER W. BLAKELY, JR.
BY
Ernest L. Brown
ATTORNEY Aug. 26, 1969          R. W. BLAKELY, JR          3,463,009
METHOD AND APPARATUS FOR MEASURING ABSOLUTE GAS PRESSURE
Filed Feb. 13, 1967                          2 Sheets-Sheet 2
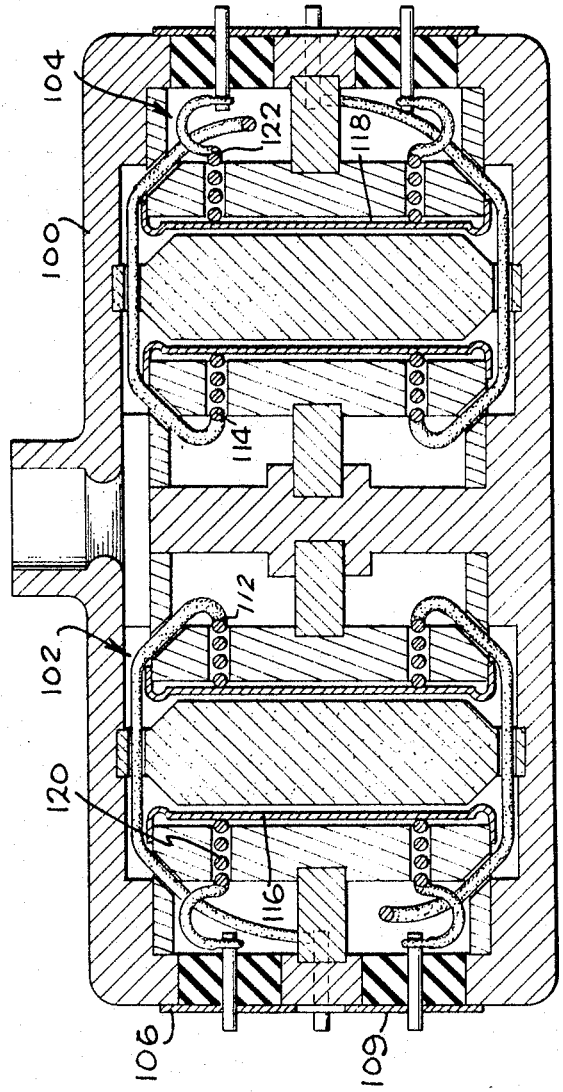
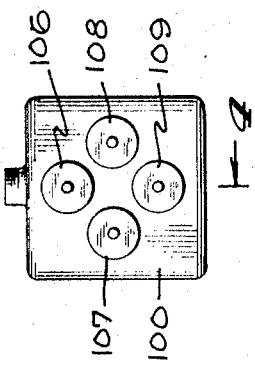
ROGER W. BLAKELY, JR.
INVENTOR.
BY
Ernest L. Brown
ATTORNEY _United States Patent Office_

3,463,009
Patented Aug. 26, 1969

3,463,009
METHOD AND APPARATUS FOR MEASURING ABSOLUTE GAS PRESSURE
Roger W. Blakely, Jr., Los Angeles, Calif., assignor to Litton Systems, Inc., Beverly Hills, Calif., a corporation of Maryland
Filed Feb. 13, 1967, Ser. No. 615,586
Int. Cl. G01l 7/20
U.S. Cl. 73—384                                16 Claims

ABSTRACT OF THE DISCLOSURE

A means and method for measuring the absolute pressure of a gas by isothermally transmitting pressure variations of predetermined frequency through the gas, and detecting the transmitted variations. A pair of diaphragms is used, one diaphragm being subject to a periodic change of volume of a constant quantity of gas, while the second diaphragm measures the change of pressure transmitted isothermally thereto through a heat sink of porous material. The variations of the two diaphragms are compared and a value of absolute pressure is obtained.

SHORT DESCRIPTION OF THE INVENTION

This invention pertains to a means and method for measuring absolute gas pressures; it pertains more particularly to such a device which measures the isothermal pressure transmission of a gas and translates that transmission into a reading of absolute gas pressure.

Aircraft are being operated in increasingly denser traffic environments. To maintain traffic separation, it is essential that each aircraft be precisely positioned at a given pressure altitude. With the operation of aircraft at very high altitudes, the measurement of atmospheric pressure must be very accurate to provide the required accuracy of measurement of altitude. Conventional devices, such as barometers, used to measure pressure altitude have a maximum accurary on the order of 0.025 percent to 0.05 percent of full scale. The most precise instruments are very complex requiring temperature control and a significant warm up period before the high accuracy may be obtained. An accuracy of 0.025 percent to 0.05 percent of full scale in the pressure reading represents a substantially greater error in measured altitude because of the non linear relation between pressure and altitude. For instance at 60,000 feet the atmospheric pressure is approximately one-fifteenth that at sea level so that an instrument having a 0.05 percent error at sea level pressure has an accuracy at 60,000 feet of no better than 0.75 percent of the pressure. At higher altitudes the errors become greater.

At various altitudes, because of the difference in density of the gas components, the mix of atmospheric gas varies. If a pressure measuring instrument is used which is sensitive not only to absolute pressure, but also to thermodynamic characteristics of the gas being measured, significant errors are introduced by the change in gas mix.

The device of this invention, however, is relatively insensitive to a variation in gas mixture while creating a measure of absolute gas pressure.

With present technology an dtraffic density of aircraft, the required vertical separation of enroute aircraft is 1000 feet. Consequently a reliable instrument for use as a pressure altitude altimeter must be highly accurate. The device contemplated by this invention is such a high accuracy, reliable pressure sensor or pressure altimeter.

In the device of this invention, the absolute pressure sensing is accomplished by sinusoidally changing the volume of the gas in the transducer at a relatively high frequency. The change in volume produces a corresponding sinusodial change or variation in pressure, the amplitude of which is proportional to the average absolute pressure in the transducer. By forcing the process to be isothermal, the periodic change in pressure is independent of the type of gas being measured. The sinusoidally changing pressure is sensed by a diaphragm with a velocity or position pickoff. With a velocity pickoff, a proportional transduction from average absolute pressure to an electrical signal occurs. With a position pickoff on the sensing diaphragm, the average absolute pressure in the transducer is proportional to the amplitude of the AC component only.

To maintain the space between the transmitting diaphragm and the sensing diaphragm substantially isothermal, the space is filled with a very porous free-standing material, such as a porous metal filter material, as a heat sink. Other materials, and shapes of materials, may alternatively be used in place of the metal filter. A typical free-standing porous metal filter material may be—for example— sintered stainless steel granules. The sintered material forms a free-standing structure which may be formed or machined into the size and shape of the space between the driving and receiving diaphragms.

It is therefore an object of this invention to sense absolute gas pressure.

It is another object of this invention to measure absolute gas pressure.

It is still another object of this invention to measure pressure-altitude.

It is likewise an object of this invention to use the isothermal conduction of pressure variation through a gas as a measure of the absolute pressure of the gas.

It is a more specific object of this invention to use a driving diaphragm for generating pressure variations and a sensing diaphrgam for receiving pressure variations through a substantially isothermal path in a gas to cause the amplitude of the received pressure variations to be a measure of the average absolute pressure of the gas.

Other objects will become apparent from the following description, taken in connection with the accompanying drawings, in which:

FIGURE 1 is an outside view of a typical device of this invention;

FIGURE 2 is a sectional view, taken at 2—2 in FIGURE 1, and further showing typical electrical connection of the device of FIGURES 1 and 2;

FIGURE 3 is a view of the outside of a second device of this invention; and

FIGURE 4 is a sectional view, taken at 4—4 in FIGURE 3.

Referring to FIGURES 1 and 2, means forming an enclosed chamber 10 has a means forming a port 12 which is adapted to allow gas whose pressure is being measured into the interior of the housing 10.

A pair of spaced-apart diaphragms 14 and 16 are supported at their outer peripheries 15 and 17 by the magnet core structures 18 and 20 which, in turn, are nested in and attached to the housing 10 at 22 and 24. An actuating coil 26 is attached to and supported by the diaphragm 14. Similarly a sensing coil 28 is attached to and supported by diaphragm 16.

The coil 26 is a coil of wire which is adapted to carry a current to generate variable magnetic fields which interact with the magnetic field of the permanent magnet structure 18. Similarly the coil 28 is a coil of wire which is adapted to carry a current or support a voltage generated by interaction with the magnetic field generated by the permanent magnet structure 20.

The permanent magnet structures 18 and 20 are sub stantially identical; they are adapted to produce substantially constant magnet fields in the regions of the coils 26 and 28. To complete the magnetic paths for the magnetic fields adjacent coils 26 and 28, centrally disposed ferromagnetic cores 30 and 32 are positioned interior of the coils 26 and 28. Magnetic shunts 34 and 36, of ferromagnetic material, carry the magnetic flux back, through the housing 10, to the permanent magnets 18 and 20. To carry the return magnetic flux, at least a portion of the housing 10 must be made of ferromagnetic material.

Electrical connection from the coils 26 and 28 are made to the exterior of the housing 10 through terminals 38, 40, 42, and 44.

Between the diaphragms 14 and 16, leaving just enough clearance to allow vibration of the diaphragms, is a heat-sink material 46. In a preferred embodiment, the heat-sink material may be a sintered mass of metallic material—for example stainless steel. The mass or cake of sintered material is positioned between the diaphragms 14 and 16. To prevent movement, material 46 is shown attached to the housing 10.

Alternatively other configurations of heat-sink may be inserted between diaphragms 14 and 16. It is important that the heat-sink material 46 be porous so that the instantaneous pressure of the gas within the material be uniform throughout the material.

Apertures such as apertures 48, 50, 52 and 54 are made in the magnet structures 18 and 20 to allow free flow of gas at the average absolute pressure into the regions 56 and 58.

A typical circuit connection for the device of FIGURE 2 is shown in FIGURE 2, but it is not intended that the invention be limited to that circuit, the circuit being merely exemplary. In the circuit, a source of exciting voltage 60 is connected in series with the coil 26 and a phase-balancing inductor 62. The coil 28 is connected in series with a summing resistor 64 which is connected to the input of an operational amplifier 66. Operational amplifier 66 has a conventional feedback resistor 68. The output of the operational amplifier 66 is connected to drive the motor 68 whose shaft is attached to drive the potentiometer 70. The potentiometer 70 is excited at the junction between inductor 62 and coil 26. The movable arm of potentiometer 70 is connected through summing resistor 72 to the summing junction 74 of the operational amplifier 66.

The voltage of voltage source 60 is a sinusoidal voltage. The voltage across the inductor 62 has an amplitude which is proportional to the amplitude of the sinusoidal current flowing through the driving coil 26 but is phase-shifted 90° from the current flow. As will be shown below, the voltage induced upon the sensing coil 28 is proportional to the average absolute pressure within the region of the isothermal material 26 and is phase-shifted 90° from the current in coil 26. The servo follow-up system through operational amplifier 66 and motor 68 balances the potentiometer 70 so that the voltage between the ground terminal and the movable terminal of potentiometer 70 is equal in amplitude and phase to the voltage across the receiving coil 28. The shaft angle of the motor 68 is then a measure of the amplitude of the output voltage of receiving coil 28. If the potentiometer 70 is a linear potentiometer, the output is linear. If the potentiometer 70 is a function potentiometer, the shaft angle of the motor 68 can be made to be any function of pressure such as—for example—pressure altitude.

If, instead of a velocity pickoff such as coil 28, a position pickoff had been used to sense the position of diaphragm 16, the inductor 62 would need to be replaced by a stable resistor of appropriate value in order to balance the servo system.

In the following technical discussion, use the definitions:

$X_1$ = the displacement of diaphragm 14, measured to the right from its rest position.

$X_2$ = the displacement of diaphragm 16, measured to the right, from its rest position.

$h$ = the average separation of the diaphragms 14 and 16.
$P_0$ = the pressure being measured.
$P$ = the instantaneous pressure of the gas between the two diaphragms 14 and 16 in the isothermal region of member 46.
$K_1$ = the linear spring rate of diaphragm 14.
$K_2$ = the linear spring rate of diaphragm 16.
$M_1$ = the effective mass of diaphragm 14 and coil 26.
$M_2$ = the effective mass of diaphragm 16 and coil 28.
$A$ = the area of each diaphragm (assuming that the area of the diaphragms are equal, which is not essential to the invention but is assumed for purposes of explanation).
$f(t)$ = the force exerted upon diaphragm 14 and coil 26 by the interaction of the magnetic field caused by a flow of current in coil 26 and the magnetic field of permanent magnet 18.

The frequency of the driving source 60 is such that the gas between the two diaphrgams 14 and 16 is trapped for the period of at least one cycle of vibration of the driver diaphragm 14; the gas behind the diaphragms 14 and 16 is not so contained and is always at the absolute pressure $P_0$. It should be noted, however, that these conditions need only be approximated. The effect of not perfectly achieving them is a reduction in scale factor; the principle of operation remains the same as described below.

The porous material 46 between the diaphragms 14 and 16 is used as a heat-sink for heat exchange so that the cyclic compression and expansion of the gas between the diaphragms is at a constant temperature, i.e. the process is isothermal. Therefore, with V equal to the volume of gas between the two diaphragms 14 and 16:

$$PV = P_0 V_0 \text{ (isothermal)} \tag{1}$$

wherein $V_0$ is the volume of gas between the two diaphragms when they are at rest, or when $X_2 = X_1$. Thus, $$V_0 = FAh \tag{2}$$

and $$V = FAh + A(X_2 - X_1) \tag{3}$$

In Equations 2 and 3, F is the effective porosity, i.e. the ratio of the amount of gas to the total volume of the cavity between diaphragms 14 and 16. Solving Equation 1 for P and substituting in Equations 2 and 3, $$P = \frac{P_0 V_0}{V} = P_0 \frac{FAh}{FAh + A(X_2 - X_1)} = P_0 \frac{Fh}{Fh + (X_2 - X_1)} \tag{4}$$

Expanding Equation 4

$$P = P_0 \left\{ 1 - \frac{(X_2 - X_1)}{Fh} + \frac{(X_2 - X_1)^2}{(Fh)^2} - \frac{(X_2 - X_1)^3}{(Fh)^3} + \cdots \right\} \tag{5}$$

Assuming that $X_2 - X_1$ is very small, the second order and higher order terms may be dropped from Equation 5.

$$P = P_0 \left\{ 1 - \frac{(X_2 - X_1)}{Fh} \right\} = \frac{P_0}{Fh} \{ Fh - (X_2 - X_1) \} \tag{6}$$

The unbalanced force on diaphragm 16, using the last results of Equation 6, is $$PA - P_0 A =$$

$$\frac{P_0 A}{Fh} \{ Fh - (X_2 - X_1) \} - \frac{P_0 A}{Fh} \{ Fh \} = \frac{P_0 A}{Fh} (X_1 - X_2) \tag{7}$$

Therefore, assuming negligible damping, the differential equation of motion of diaphragm 16 due to the force transmitted between diaphragms 14 and 16 is $$M_2 \ddot{X}_2 + K_2 X_2 = \frac{P_0 A}{Fh} (X_1 - X_2) \tag{8}$$

which may be rearranged $$M_2\ddot{X}_2 + \left[K_2 + \frac{P_0A}{Fh}X_2\right] = \frac{P_0A}{Fh}X_1 \quad (9)$$

The unbalanced force on the diaphragm 14 is, by similarity to Equation 7, $$\frac{P_0A}{Fh}(X_2 - X_1) + f(t) \quad (10)$$

The differential equation of motion of diaphragm 14, assuming negligible damping, may then be written $$M_1\ddot{X}_1 + \left[K_1 + \frac{P_0A}{Fh}\right]X_1 = \frac{P_0A}{Fh}X_2 + f(t) \quad (11)$$

assuming $$X_1(o) = X_2(0) = \dot{X}_1(o) = \dot{X}_2(o) = 0 \quad (12)$$

and taking the Laplace transforms of Equations 9 and 11

$$M_2s^2X_2(s) + \left[K_2 + \frac{P_0A}{Fh}\right]X_2(s) = \frac{P_0A}{Fh}X_1(s) \quad (13)$$

$$M_1s^2X_1(s) + \left[K_1 + \frac{P_0A}{Fh}\right]X_1(s) = \frac{P_0A}{Fh}X_2(s) + f(s) \quad (14)$$

Equations 13 and 14 may be solved simultaneously $$\frac{X_2(s)}{f(s)} = \frac{\frac{P_0A}{Fh}}{M_1M_2s^4 + [M_1K_2 + M_2K_1] + (M_1+M_2)\frac{P_0A}{Fh}]s^2 + \left[K_1K_2 + (K_1+K_2)\frac{P_0A}{Fh}\right]} \quad (15)$$

To obtain the steady state response of the system for a sinusoidal voltage input from voltage source 60, set $s$ equal to $j\omega$ and collect terms in the resulting equation $$\frac{X_2(j\omega)}{f(j\omega)} = \frac{\frac{P_0A}{Fh}}{M_1M_2\omega^4 - (M_1K_2 + M_2K_1)\omega^2 + K_1K_2) + \frac{P_0A}{Fh}(K_1 + K_2 - M_1\omega^2 - M_2\omega^2)} \quad (16)$$

By matching the mechanical design and the operating frequency, the pressure dependence of the denominator may be eliminated, i.e. by forcing the last term of the denominator of Equation 16 to be equal to zero. Thus, if $$K_1 + K_2 - M_1\omega^2 = 0 \quad (17)$$

then $$\frac{X_2(j\omega)}{f(j\omega)} = \frac{P_0A}{Fh(M_1\omega^2 - K_1)(M_2\omega^2 - K_2)} \quad (18)$$

The above condition may be met by either turning the two diaphragms so that their natural frequencies are equal to the operating frequency; i.e. by making $K_1 = M_1\omega^2$ and $K_2 = M_2\omega^2$, or by stagger tuning the diaphragms and operating at a frequency between the two natural frequencies. The velocity of the diaphragm 16, and hence the coil 28, then becomes, in accordance with conventional complex number theory, $$\frac{\dot{X}_2(j\omega)}{f(j\omega)} = \frac{j\omega P_0A}{Fh(M_1\omega^2 - K_1)(M_2\omega^2 - K_2)} \quad (19)$$

Thus, from Equations 18 and 19 it may be seen that the amplitude of the sinusoidal variation in position and the amplitude of the sinusoidal velocity of diaphragm 16 are linear functions of the pressure $P_0$. Therefore, by driving diaphragm 14 with a sinusoidal force at a proper frequency and measuring the sinsodial displacement or velocity of diaphragm 16, the measurement of the ratio of the A.C. amplitude of the output signal to the A.C. amplitude of the input signal is a direct measurement of the pressure within the housing 10.

In the above derivation it was stated that the porous material 46, between the diaphragms 14 and 16, acts as a heat-sink and changes the cyclic compression and expansion to an isothermal process. The following analysis shows this to be true.

For purposes of example, assume a porous stainless steel filter material is used for element 46.

For air:
$C_p = 0.238$ B.t.u./lb. ° F.
$\rho = 0.08$ lb./ft.$^3$ at 1 atmosphere
$\rho C_p = 0.019$ B.t.u./ft.$^3$ ° F.

For stainless steel:
$C_p = 0.12$ B.t.u./lb. ° F.
$\rho = 500$ lb./ft.$^3$
$\rho C_p = 60$ B.t.u./ft.$^3$ ° F.

Thus the ratio of heat capacities, $\rho C_p$, is $60/0.019 = 3160$ to 1. Consequently, provided that the heat generated within the air during any cycle of the compression has time to flow into the steel, any significant amount of stainless steel in the gap between diaphragms 14 and 16 provides a very effective heat-sink for the air at pressures up to a few atmospheres.

To determine whether the heat generated within the air during any cycle of the compression has time to flow into the steel, note that the time constant, $\tau$, for transient heat flow problems in of the order of $$L^2/\pi^2\alpha \quad (20)$$

wherein L is the separation between the metal surfaces of the metal granules in the porous filter 46.

$\alpha = K/\rho C_p$ which is about one square foot per hour for air at one atmosphere $\rho$ = density of the air
$C_p$ = the specific heat of the air
$K$ = the thermal conductivity of the air If the separation, L (or pore size) is on the order of 0.020 inch, then, substituting into Equation 20, $\tau$ equals $2.8 \times 10^{-7}$. Since $\alpha$ is inversely proportional to the density of the gas, the time constant, $\tau$, decreases from $2.8 \times 10^{-7}$ seconds as the pressure being measured is being reduced from one atmosphere. This is a very small time compared to a time per cycle of $2 \times 10^{-3}$ seconds for an operating frequency of 500 cycles per second. Also, it should be noted that the volume between the diaphragms 14 and 16 is effectively filled with porous material if the material stands within 0.020 inch of the diaphragms, thus leaving sufficient freedom for diaphragm motion.

In the instrument shown in FIGURES 3 and 4, two of the instruments of FIGURES 1 and 2 are packages back-to-back within a single housing 100. The lead wires from the two coils on each of the instruments 102 and 104 are carried to the outside through terminals, of which typical terminals are shown in FIGURE 3 at 106, 107, 108 and 109 in the housing 100. The embodiment of FIGURES 3 and 4 is made symmetrical, with the two instruments 102 and 104 identical, and the driving coils 112 and 114 adapted to be driven in opposing directions or phase opposition so that there is no net force on the case 100. This, in turn, gives opposing motion of the receiver diaphragms 116 and 118 which results in zero net force on the case or housing 100. The output signals from the sensing coils 120 and 122 are summed to cause the two signal amplitudes to add to produce an output signal which has twice the amplitude of the signals generated by the individual sensing coils. When the unit of FIGURES 3 and 4 is subjected to external vibration the two receiver diaphragms 116 and 118 vibrate in the same direction. The vibration of the receiver diaphragms 116 and 118 in the same direction generates signals of opposite polarity, whereby the net signal of the summed outputs, due to the presence of vibration on the housing 100, is substantially zero.

It should also be noted that the sensitivity of the diaphragms 116 and 118 to vibrations of the housing 100 are dependent upon the mass of the diaphragms, whereby reduction of the mass of the diaphragms and the sensing coils 120 and 122—for example by using capacitive rather than inductive forcers and sensors—reduces the mass of the moving diaphragm and its attached apparatus thus reducing the sensitivity of the diaphragm and its attached apparatus to external vibrations.

The process and apparatus described in this invention is an extremely accurate, extremely reliable gas pressure sensing method and apparatus which is particularly adapted to measure the absolute pressure of gas mixtures, such as the atmosphere, without sensitivity of the composition and variability in thermodynamic characteristics of the gas.

Although the device of this invention has been described in detail above, it is not intended that the invention should be limited by that description.

I claim:

1. A method for sensing absolute gas pressure comprising:
   sinusoidally changing the volume of the gas whose pressure is to be sensed to produce a corresponding sinusoidal variation in pressure, the amplitude of which is proportional to the average pressure in the transducer;
   sensing the amplitude of said sinusoidal variation in pressure; and
   characterized by maintaining the region of transmission of said variation of pressure substantially at a constant temperature, by heat exchange, throughout a period of at least one cycle of the sinusoidal variation.

2. A method as recited in claim 1 in which the frequency of the sinusoidal variation is fixed.

3. A method of measuring the absolute pressure of a gas comprising:
   substantially isothermally varying repetitively the volume of a substantially constant quantity of said gas at a predetermined frequency; and
   detecting pressure variations in said constant quantity of gas, the amplitude of said pressure variations being a measure of said absolute pressure.

4. The method of claim 3 and further comprising comparing the detected pressure variations to the applied volume variations in said constant quantity of gas.

5. Apparatus for measuring the absolute pressure of a gas comprising:
   means forming a chamber for containing said gas;
   a controllably movable member mounted within said chamber to vary the volume of a substantially constant quantity of said gas;
   a pressure variation sensing member mounted within said chamber; and
   characterized by means for maintaining the gas path in said chamber between said members substantially at a constant temperature, by heat exchange, throughout at least the period of one cycle of operation.

6. A device as recited in claim 5 in which said means for maintaining said gas path isothermal comprises metallic material, distributed in said gas, between said members.

7. A device as recited in claim 6 in which said material comprises sintered metallic material.

8. A device as recited in claim 7 in which said metalilc material is freestanding.

9. A device as recited in claim 6 in which said members are acoustic diaphragms.

10. A device as recited in claim 9 and further comprising electrical means attached to energize said movable member.

11. A device as recited in claim 10 in which said electrical means comprises means forming a permanent magnet, mechanically attaced to, and immovable relative to, said means forming a chamber; and an electrical coil, attached to said movable diaphragm and positioned to interact with the field of said means forming a permanent magnet.

12. A device as recited in claim 10 and further comprising means for measuring the amplitude of the pressure variations sensed by said sensing member.

13. A device as recited in claim 12 and further comprising means for comparing the amplitudes of the change of pressure and the change of volume in said constant quantity of gas.

14. A device as recited in claim 13 and further comprising means for comparing the amplitudes of the rate of change of pressure and the rate of change of volume in said constant quantity of gas.

15. A pair of devices as recited in claim 5 in which said movable members are mounted within said chamber to apply equal but opposite vibratory forces to said means forming said chamber.

16. A device as recited in claim 15 in which the sensing members of said pair of devices generate electrical signals which are adapted to be summed in phase opposition to generate double-amplitude signals caused by pressure variations in said gaseous medium and to cancel signals due to mechanical vibration of said means forming a chamber.

References Cited

UNITED STATES PATENTS 3,019,656   2/1962   Millar _____ 73—39

LOUIS R. PRINCE, Primary Examiner

DENIS E. CORR, Assistant Examiner

U.S. Cl. X.R.

73—398, 406